June 21, 1949.    J. W. ERICKSON    2,473,639
DOOR CASING GAUGE
Filed April 24, 1944
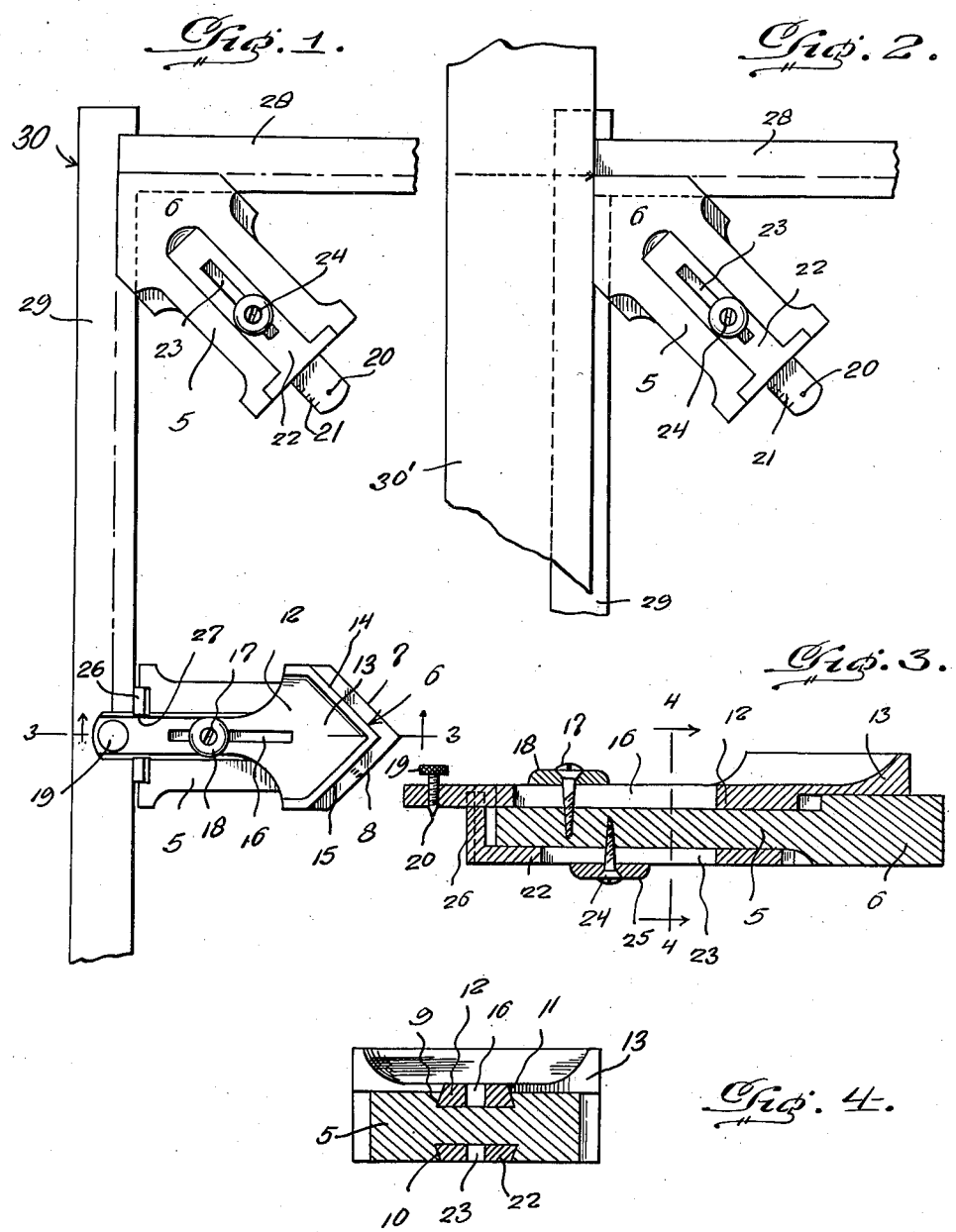
Inventor
John W. Erickson,
By McMorrow & Berman
Attorneys Patented June 21, 1949

2,473,639

UNITED STATES PATENT OFFICE 2,473,639

DOOR CASING GAUGE

John W. Erickson, Seattle, Wash.

Application April 24, 1944, Serial No. 532,501

1 Claim. (Cl. 33—42)

The present invention relates to new and useful improvements in carpenters' tools, and more particularly to a door casing gauge adapted for marking the edges of a door jamb in order to cut the trim formed thereon.

An important object of the present invention is to provide a door casing gauge of this character embodying means for marking the corner of the door jamb as well as to mark the sides and head of the jamb.

A further important object of the invention is to provide a gauge of this character adapted to facilitate proper positioning the side casing on the door jamb.

A still further object is to provide a casing gauge for doors of simple and practical construction, which is efficient and reliable in use, relatively inexpensive to manufacture and otherwise well adapted for the purpose for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a view in elevation showing the gauge in position for marking the corner of a door jamb as well as for marking the side thereof.

Figure 2 is a similar view showing the tool in position for attaching the side casing to the jamb.

Figure 3 is a longitudinal sectional view taken substantially on a line 3—3 of Figure 1.

Figure 4 is a transverse sectional view taken on a line 4—4 of Figure 3.

Referring now to the drawing in detail, the numeral 5 designates the body of the tool of flat relatively elongated form and having at one end a head 6 formed with inclined edges 7 and 8 disposed at right angles to each other.

Dovetailed grooves 9 and 10 (see Figure 4) are formed in the opposite surfaces of the body rearwardly of the head, the groove 9 having a dovetailed rib 11 slidably mounted therein and formed on the under side of a gauge plate 12. The gauge plate 12 is also formed with a head 13 having inclined side edges 14 and 15 likewise at right angles to each other and parallel to the edges 7 and 8, respectively, of the head 6.

A longitudinal slot 16 is formed in the ribbed portion of the gauge plate 12 in which a screw 17 is freely positioned, the screw being threaded into the body 5. A button 18 is carried by the screw on top of the gauge plate 12 for clamping the gauge plate in adjusted position on the body 5 by the tightening of the screw 17.

The rear end of the gauge plate 12 extends beyond the body 5 and is provided with a marking screw 19 threaded therein and having a pointed end 20 projecting below the gauge plate 12.

The under side of the rearwardly extending end of the gauge plate 12 is formed with a scale 21.

A second gauge plate 22 of dovetailed shape in cross section is slidably mounted in the groove 10 at the side of the body 5 opposite from the gauge plate 12 and the gauge plate 22 is likewise formed with a longitudinal slot 23 in which a screw 24 is freely positioned and threaded into the body 5. A button 25 is carried by the screw 24 for securing the gauge plate 22 in adjusted position by the tightening of said last-named screw.

The rear end of the gauge plate 22 is formed with an upstanding flange 26 having a notch 27 in its end slidably receiving the rear end of the gauge plate 12.

In the operation of the tool, the head 13 of the gauge plate 12 is moved inwardly from the front edge of the head 6 of the body so that the head 6 will project outwardly beyond the head 13, as shown in Figure 3 of the drawing. The tool is then placed at the corner of the door jamb designated generally at 30 with the right angular edges 14 and 15 of the head 13 in abutting engagement with the inner surface of the head 28 and side 29 of the jamb. The right angular side edges 7 and 8 of the head 6 will thus overlie the sides of the head 28 and side 29 of the jamb to act as a guide for marking the jamb with a pencil or other instrument applied to the adjacent face of the jamb along the edges of the applied head 6 of the tool to indicate the depth of the cut for forming the trim on the jamb.

The tool is then turned into the position shown at the lower portion of Figure 1 of the drawing so that the flange 26 will abut the inner surface of the side 29 of the jamb and with the marking point 20 in contact with the edge of the jamb so that upon sliding the tool along the jamb, the jamb will be properly marked for cutting the trim.

The tool may also be used for indicating the position of the side casing 30' to be placed on the jamb by positioning the tool in the corner of the jamb, as shown in Figure 2 of the drawing, the edge of the head 6 serving as an abutment for the casing.

It is believed the details of construction, operation and advantages of the tool will be readily understood from the foregoing without further detailed explanation.

Having thus described the invention, what I claim is:

A gauge for positioning lines parallel to and equidistant from the inner edges of a rectangular frame comprising an elongated gauge body having one end substantially perpendicular to the longitudinal center line of such body and at its opposite end two mutually perpendicular edges symmetrically disposed relative to said center line so that said edges intersect along a line of jointure perpendicularly intersecting said longitudinal center line and diverge from said line of jointure at substantially equal angles to said center line, said body having in each face thereof a respective undercut groove extending along said center line from said one end of said body to locations adjacent said opposite end of the latter, an elongated gauge plate overlying one side of said body and having a longitudinally extending rib thereon slidably received in the corresponding groove of said body, said gauge plate including a narrow portion extending beyond said one end of said body and a marginally flanged wide portion having mutually perpendicular end edges respectively parallel to the mutually perpendicular end edges of said body, a slide slidably engaged in the groove in the other side of said body and having at one end an elongated, perpendicularly disposed flange parallel to said one end of said body and provided in its edge with a notch slidably receiving the narrow portion of said gauge plate, a scribe point carried by said gauge plate outwardly of said flange and positioned at a predetermined distance from said flange, regardless of the longitudinal position of said guide plate relative to said body, by sliding said slide relative to said body, said gauge plate and said slide having respective longitudinally extending slots therein, and respective clamp screws extending from said body through said gauge plate and slide slots to releasably clamp said gauge plate and said slide in adjusted position longitudinally of said body.

JOHN W. ERICKSON.

REFERENCES CITED

The following references are of record in the file of this patent:

UNITED STATES PATENTS

| Number | Name | Date |
|---|---|---|
| 924,877 | Banfill | June 15, 1909 |
| 1,787,313 | Houts | Dec. 30, 1930 |
| 2,112,179 | Sharrar | Mar. 22, 1938 |
| 2,144,697 | Zangrando | Jan. 24, 1939 |

FOREIGN PATENTS

| Number | Country | Date |
|---|---|---|
| 108,239 | Sweden | Aug. 17, 1943 |